United States Patent
Don et al.

(10) Patent No.: US 12,197,593 B2
(45) Date of Patent: Jan. 14, 2025

(54) ENCRYPTION KEY ENHANCEMENT OF STORAGE ARRAY SNAPSHOTS

(71) Applicant: Dell Products L.P., Round Rock, TX (US)

(72) Inventors: Arieh Don, Newton, MA (US); Philippe Armangau, Kalispell, MT (US); Tomer Shachar, Beer-Sheva (IL)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 17/975,762

(22) Filed: Oct. 28, 2022

(65) Prior Publication Data
US 2024/0143790 A1    May 2, 2024

(51) Int. Cl.
*G06F 21/60*    (2013.01)
*G06F 3/06*    (2006.01)
*G06F 11/14*    (2006.01)

(52) U.S. Cl.
CPC ............ *G06F 21/602* (2013.01); *G06F 3/067* (2013.01); *G06F 11/1451* (2013.01)

(58) Field of Classification Search
CPC .... G06F 21/602; G06F 11/1451; G06F 3/067; G06F 3/0623

USPC ........................................................ 713/189
See application file for complete search history.

(56) References Cited

U.S. PATENT DOCUMENTS

| | | | |
|---|---|---|---|
| 9,953,178 B2* | 4/2018 | Umbehocker | G06F 21/6218 |
| 10,503,700 B1* | 12/2019 | Sanvido | G06F 16/9535 |
| 10,628,266 B2* | 4/2020 | Nallathambi | G06F 3/0619 |
| 11,461,183 B2* | 10/2022 | Govindan | G06F 3/0649 |
| 11,474,913 B2* | 10/2022 | Bhatnagar | G06F 11/1435 |
| 11,526,283 B1* | 12/2022 | Mallick | G06F 9/45558 |
| 11,822,706 B2* | 11/2023 | Anchi | H04L 9/0894 |
| 12,032,724 B2* | 7/2024 | Vijayasankar | G06F 3/0664 |
| 2022/0253389 A1* | 8/2022 | Fay | H04L 9/50 |

* cited by examiner

*Primary Examiner* — Amare F Tabor
(74) *Attorney, Agent, or Firm* — Krishnendu Gupta; Nikhil Patel

(57) ABSTRACT

One or more aspects of the present disclosure relate to enhancing modular device snapshot-to-encryption-key associations. In embodiments, an input/output (IO) workload can be received at a storage array. The IO workload can include an IO request to write encrypted data on the storage array. The IO request's metadata can also be parsed for information such as snap parameters. Further, an encryption key identifier (ID) can be received from a host, and snapshots of a storage unit can be created with the parsed information and the key ID.

18 Claims, 9 Drawing Sheets

ENCRYPTION KEY ENHANCEMENT OF STORAGE ARRAY SNAPSHOTS

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

In aspects of the present disclosure, a method includes receiving an input/output (IO) workload at a storage array. The IO workload includes an IO request to write encrypted data on the storage array. The method also includes parsing the IO request's metadata for information, including snap parameters, receiving an encryption key identifier (ID) from a host, and creating snapshots of a storage unit with the parsed information and the key ID.

In embodiments, the method can further include establishing the virtual storage volume (VSV) for a host entity using one or more storage device portions of the storage array and parsing the IO request's metadata for a target VSV to write the encrypted data.

In embodiments, the method can further include managing encryption tools by a host key manager, where managing the encryption tools includes mapping each encryption tool to their corresponding virtual storage volumes (VSVs) or applications for which they encrypt data and tracking encryption key IDs corresponding to the encrypted data encrypted by each encryption tool.

In embodiments, the method can include providing a host application system with an encryption tool and encrypting data generated by each application managed by the host application system using the encryption tool.

In embodiments, the method can include creating the snapshots according to a predefined snap schedule, a dynamically generated snap schedule, or an ad-hoc snap request issued by a host application system with a replication management engine.

In embodiments, the method can include obtaining snapshot metadata of snapshots generated by the storage array according to a predefined or dynamically generated snap schedule.

In embodiments, the method can further include encrypting the snapshots using an encryption tool and generating at least one snapshot data packet with metadata for each snapshot. In embodiments, the method can include appending each snapshot data packet with corresponding parsed information. In embodiments, the method can include remotely replicating the snapshots by sending each snapshot data packet to a remote storage system.

In embodiments, the method can include establishing a replication management engine on a host application system.

In embodiments, the method can further include configuring a snap management data structure to store a snapshot's metadata, where the snapshot metadata includes temporal snapshot information, snap name, snap ID, snapped device, or storage array details corresponding to the snapshot, configuring the snapshot metadata to prevent or limit access or UI presentation of encryption key IDs, and wrapping or appending an IO request with corresponding snapshot metadata using the snap management data structure.

In embodiments, the method can further include restoring at least one of the encrypted snapshots, where restoring at least one of the encrypted snapshots includes parsing the key ID from a corresponding snapshot on the storage array and providing the host with the key ID, enabling the host to obtain the key ID's corresponding encryption key from a host key manager that manages encryption keys.

A system includes a processor and memory in aspects of the present disclosure. Using the processor and memory, the system is configured to receive an input/output (IO) workload at a storage array, where the IO workload includes an IO request to write encrypted data on the storage array. The system is also configured to parse the IO request's metadata for information, including snap parameters, receive an encryption key identifier (ID) from a host, and create snapshots of a storage unit with the parsed information and the key ID.

In embodiments, the system can be further configured to establish the virtual storage volume (VSV) for a host entity using one or more storage device portions of the storage array and parse the IO request's metadata for a target VSV to write the encrypted data.

In embodiments, the system can be further configured to manage encryption tools by a host key manager, where managing the encryption tools includes mapping each encryption tool to their corresponding virtual storage volumes (VSVs) or applications for which they encrypt data and track encryption key IDs corresponding to the encrypted data encrypted by each encryption tool.

In embodiments, the system can be further configured to provide a host application system with an encryption tool and encrypted data generated by each application managed by the host application system using the encryption tool.

In embodiments, the system can be further configured to create the snapshots according to a predefined snap schedule, a dynamically generated snap schedule, or an ad-hoc snap request issued by a host application system with a replication management engine.

In embodiments, the system can be further configured to obtain snapshot metadata of snapshots generated by the storage array according to a predefined or dynamically generated snap schedule.

In embodiments, the system can be further configured to encrypt the snapshots using an encryption tool and generate at least one data packet with metadata for each snapshot. The system can append each snapshot data packet with corresponding parsed information in embodiments. In embodiments, the system can remotely replicate the snapshots by sending each snapshot data packet to a remote storage system.

In embodiments, the system can be further configured to establish a replication management engine on a host application system.

In embodiments, the system can be further configured to configure a snap management data structure to store a snapshot's metadata, where the snapshot metadata includes temporal snapshot information, snap name, snap ID, snapped device, or storage array details corresponding to the snapshot, configure the snapshot metadata to prevent or limit access or UI presentation of encryption key IDs, and wrap or append an IO request with corresponding snapshot metadata using the snap management data structure.

In embodiments, the system can be further configured to restore at least one of the encrypted snapshots, where restoring at least one of the encrypted snapshots includes parsing the key ID from a corresponding snapshot on the storage array and providing the host with the key ID, enabling the host to obtain the key ID's corresponding encryption key from a host key manager that manages encryption keys.

Other technical features are readily apparent to one skilled in the art from the following figures, descriptions, and claims.

BRIEF DESCRIPTION OF THE DRAWINGS

The preceding and other objects, features, and advantages will be apparent from the following more particular description of the embodiments, as of the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. As such, these companies often use storage arrays to store and manage the data. Because a business can configure a storage array with multiple storage devices (e.g., hard-disk drives (HDDs) or solid-state drives (SSDs)), a company can scale (e.g., increase or decrease) and manage an array's storage capacity more efficiently compared to a server. In addition, a company can use a storage array to read/write data required by one or more business applications.

In some circumstances, a business uses data encryption techniques that encrypt data before the data is sent to a storage array. Thus, a bad actor will find the data useless if the actor intercepts data during transmissions or hacks a storage array. Additionally, any snapshots a storage array creates to back up the data only include encrypted snapshots (or snaps). Additionally, a business can use several tools to encrypt data. Thus, if a business host request access to a snapshot's corresponding data, it requires knowledge of the tool and encryption keys used to encrypt the data corresponding to the snapshot.

Current naïve approaches require business IT administrators to maintain lists in, e.g., excel documents identifying the encryption tools and their corresponding encryption keys. Unfortunately, such an approach is not scalable and hard to maintain. Accordingly, embodiments of the present disclosure generate unique key identifiers (IDs) having a data format enabling it to be stored with a snapshot. Thus, if a business wants to recover data from a snapshot, the embodiments of the present disclosure enable quick a host to extract the key IDs embedded within a snap to decrypt the data, as described in greater detail herein.

Figure 1:
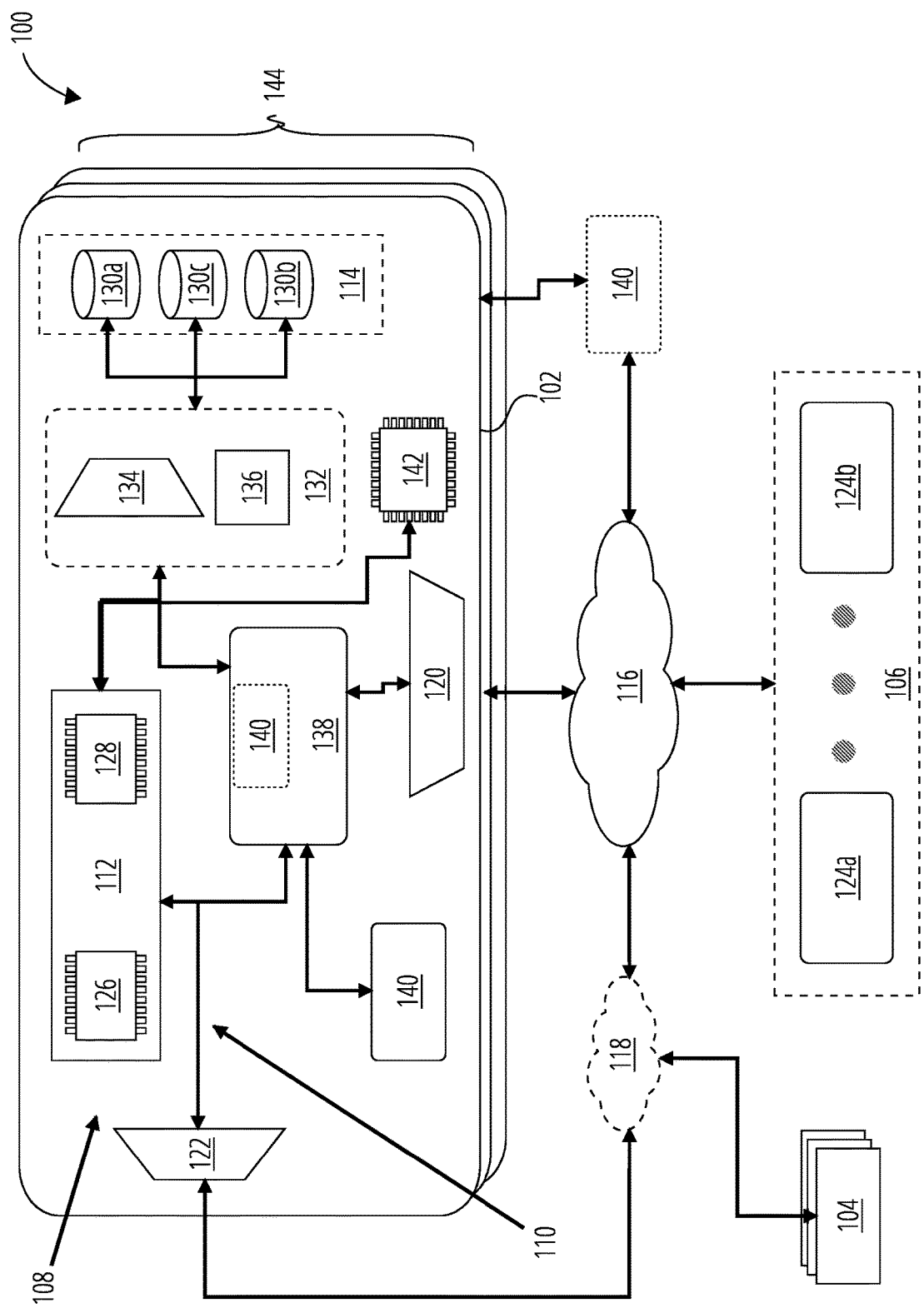
FIG. 1 shows a distributed network environment in accordance with embodiments of the present disclosure.

Regarding FIG. 1, a distributed network environment 100 can include a storage array 102a, a remote system 104, and hosts 106. In embodiments, the storage array 102a can include components 108 that perform one or more distributed file storage services. In addition, the storage array 102a can include one or more internal communication channels 110 like Fibre channels, busses, and communication modules that communicatively couple the components 108. Further, the distributed network environment 100 can define an array cluster 112 that can include two or more storage arrays, including the storage array 102a.

In embodiments, the storage array 102a, components 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102a, remote system 104, and hosts 106 can virtualize one or more of their respective physical computing resources (e.g., processors (not shown), memory 114, and persistent storage 116).

In embodiments, the storage array 102a and, e.g., one or more hosts 106 (e.g., networked devices) can establish a network 118. Similarly, the storage array 102a and a remote system 104 can establish a remote network 120. Further, the network 118 or remote network 120 can have a network architecture that enables networked devices to send/receive electronic communications using a communications protocol. For example, the network architecture can define a storage area network (SAN), local area network (LAN), wide area network (WAN) (e.g., the Internet), and Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102a can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102a to the network 118 (e.g., SAN). Further, the HA 122 can receive and direct IOs to one or more of the storage array's components 108, as described in greater detail herein.

Likewise, a remote adapter (RA 124) can connect the storage array 102a to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-b, running one or more applications. The applications can require one or more of the storage array's services. Accordingly, each application can send one or more input/output (IO) messages (e.g., a read/write request or other storage service-related request) to the storage array 102a over the network 118. Further, the IO messages can include metadata defining performance requirements according to a service level agreement (SLA) between hosts 106 and the storage array provider.

In embodiments, the storage array 102a can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 132 can execute to perform one or more storage-related services. For example, the storage array 102a can have a multiprocessor architecture that can include one or more CPUs (central processing units) and GPUs (graphical processing units).

In addition, the storage array 102a can deliver its distributed storage services using persistent storage 116. For example, the persistent storage 116 can include multiple thin-data devices (TDATs) such as persistent storage drives 132a-c. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102a can include a device interface (DI 134) that manages access to the array's persistent storage 116. For example, the DI 134 can include a device adapter (DA 136) (e.g., storage device controller), flash drive interface 138, and the like that controls access to the array's persistent storage 116 (e.g., storage devices 128a-c).

Likewise, the storage array 102a can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-b) remote/distributed storage services by virtualizing the storage array's memory/storage resources (memory 114 and persistent storage 116, respectively).

In embodiments, the storage array 102a can also include a controller 142 (e.g., management system controller) that can reside externally from or within the storage array 102a and one or more of its components 108. When external from the storage array 102a, the controller 142 can communicate with the storage array 102a using any known communication connections. The communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, computing, storage, and memory resources as described in greater detail herein.

Figure 2:
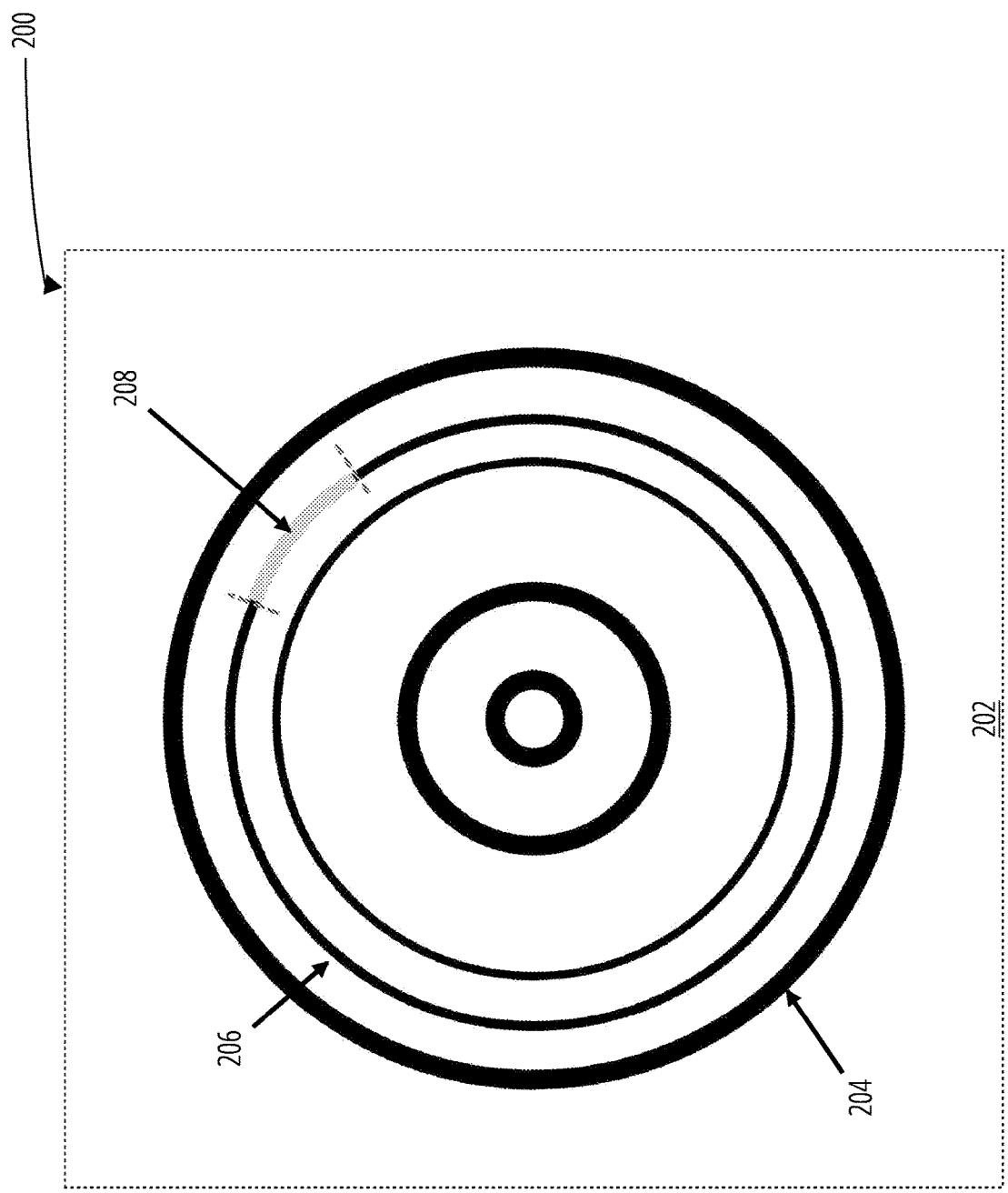
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132a-132b. For example, the EDS 140 can provide a host, e.g., client machine 126a, with a virtual storage device (e.g., thin-device (TDEV)) that logically represents one or more of the storage array's physical storage resources or slices/portions thereof (e.g., extents). Further, the EDS 140 can provide each TDEV with a unique identifier (ID) like a target ID (TID). Additionally, EDS 140 can map each TID to its corresponding TDEV using a logical unit number (LUN) (e.g., a pointer to the TDEV). The EDS 140 can also generate a searchable data structure, mapping logical storage representations to their corresponding physical address spaces. Thus, EDS 100 can enable the HA 122 to present the hosts 106 with logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). Additionally, the EDS 140 can group sets of continuous LBAs to establish one or more extents. Further, the EDS 140 can group a set of extents to establish a virtual storage device (e.g., TDEV). Thus, each TDEV can include extents and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102a can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 140 can define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. In embodiments, the first and second thresholds can correspond to the same threshold.

The following text included details of one or more methods or flow diagrams in accordance with this disclosure. For simplicity of explanation, each method is depicted and described as a sequence of operations. However, each sequence can be altered without departing from the scope of the present disclosure. Additionally, one or more of each sequence's operations can be performed in parallel, concurrently, or a different sequence. Further, not all illustrated operations are required to implement each method described by this disclosure.

Figure 3:
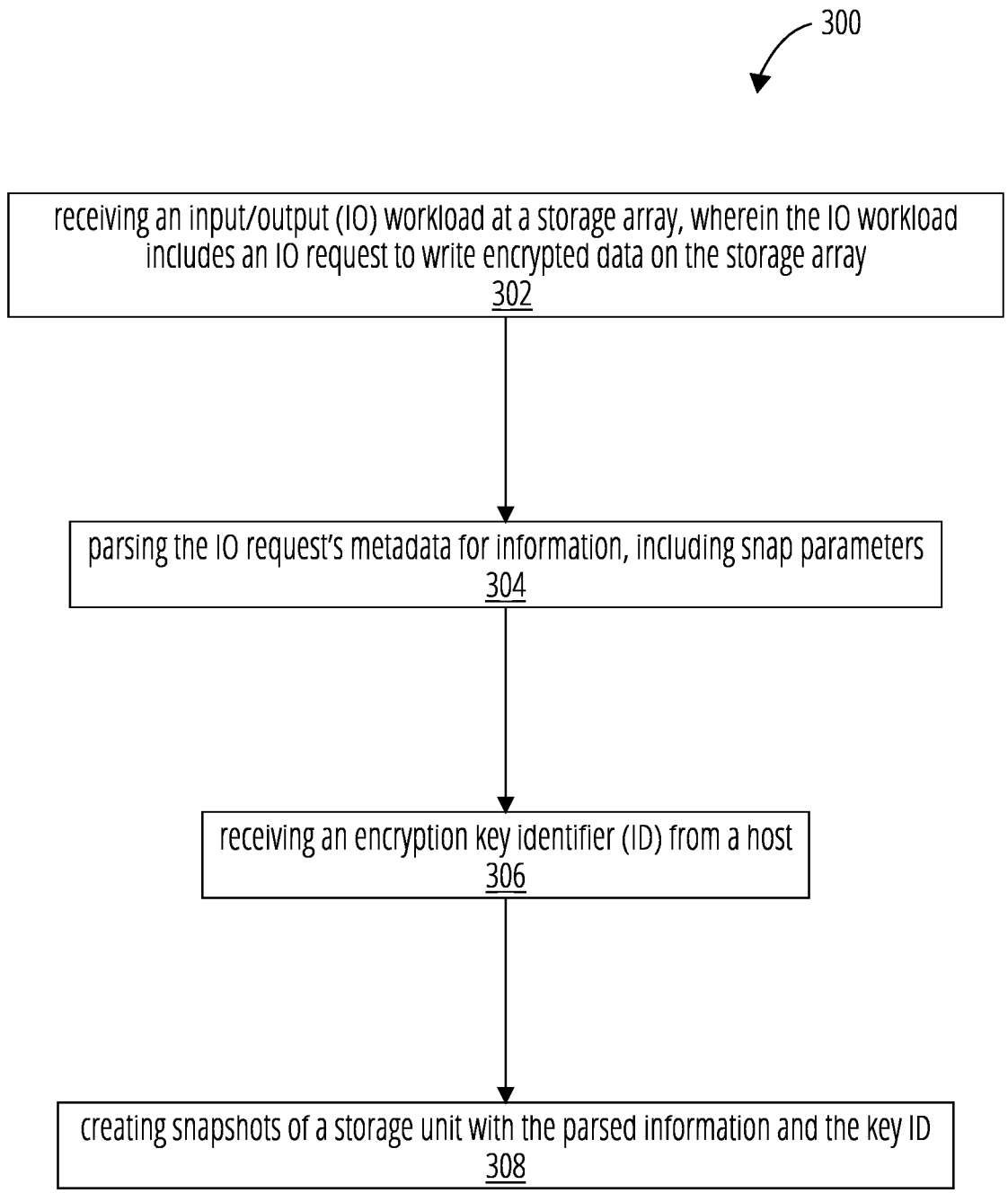
FIG. 3 is a flow diagram of an example method for enhancing storage array snapshots with encryption keys in accordance with embodiments of the present disclosure.

Regarding FIG. 3, In 302, method 300 receives an input/output (IO) workload at a storage array, wherein the IO workload includes an IO request to write encrypted data on the storage array. In 304, method 300 parses the IO request's metadata for information, including snap parameters. In 306, method 300 receives a host's encryption key identifier (ID). Finally, in 308, method 300 creates snapshots of a storage unit with the parsed information and the key ID.

Figure 4:
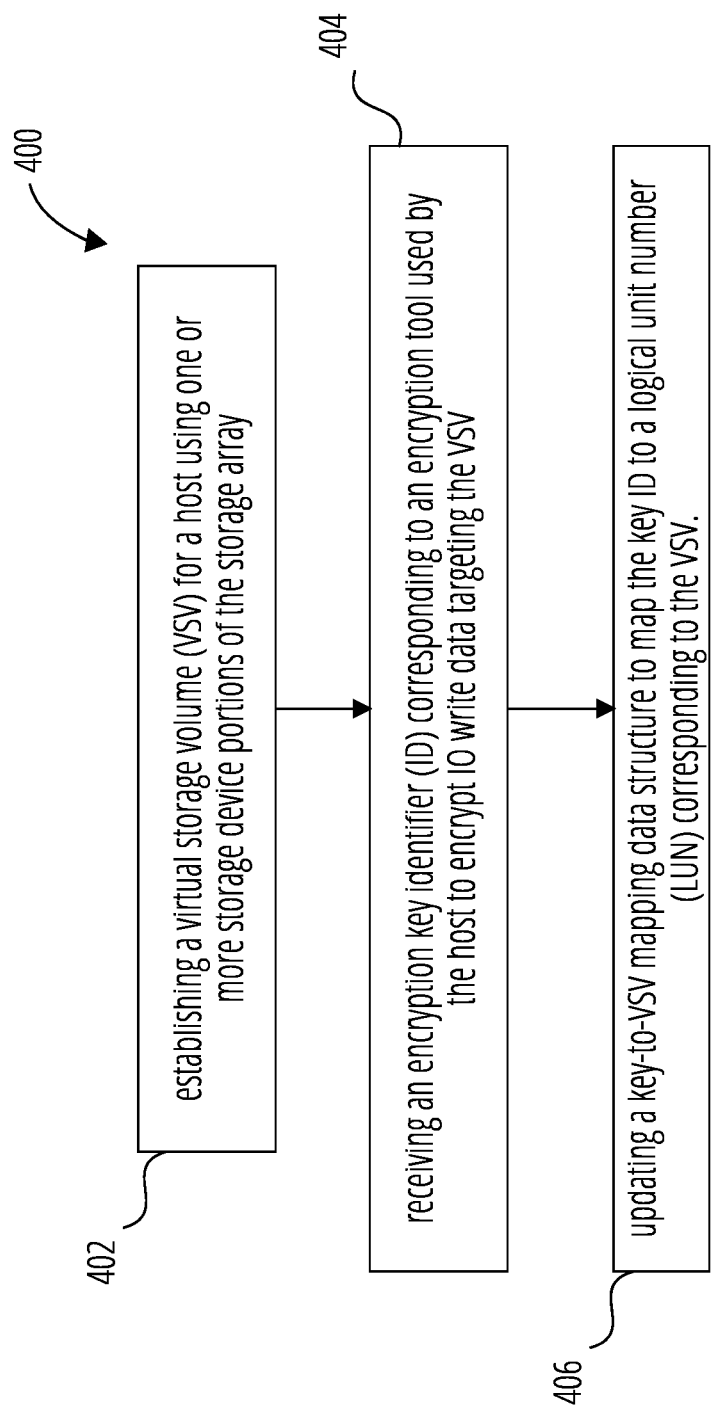
FIG. 4 is a flow diagram of an example method for mapping a virtual volume to a corresponding encryption key ID in accordance with embodiments of the present disclosure.

Regarding FIG. 4, an example method 400 maps a virtual volume to a corresponding encryption key ID. Although the example method 400 depicts a particular sequence of operations, the sequence can be altered without departing from the scope of the present disclosure. For example, some of the operations depicted can be performed in parallel or in a different sequence that does not materially affect the function of the method 400. In other examples, different components of an example device or system that implements the method 400 can perform functions at substantially the same time or in a specific sequence.

According to some examples, the method includes establishing a virtual storage volume (VSV) for a host using one or more storage device portions of the storage array at 402. For example, the EDS 138 of FIG. 1 can establish a virtual storage volume (VSV) for a host using one or more storage device portions of the storage array.

According to some examples, the method includes receiving an encryption key identifier (ID) corresponding to an encryption tool used by the host to encrypt IO write data targeting the VSV at 404. For example, the controller 140 of FIG. 1 can receive an encryption key identifier (ID) corresponding to an encryption tool used by the host to encrypt IO write data targeting the VSV.

According to some examples, the method includes updating a key-to-VSV mapping data structure to map the key ID to a logical unit number (LUN) corresponding to the VSV at 406. For example, the controller 140 of FIG. 1 can update a key-to-VSV mapping data structure to map the key ID to a logical unit number (LUN) corresponding to the VSV.

Figure 5:
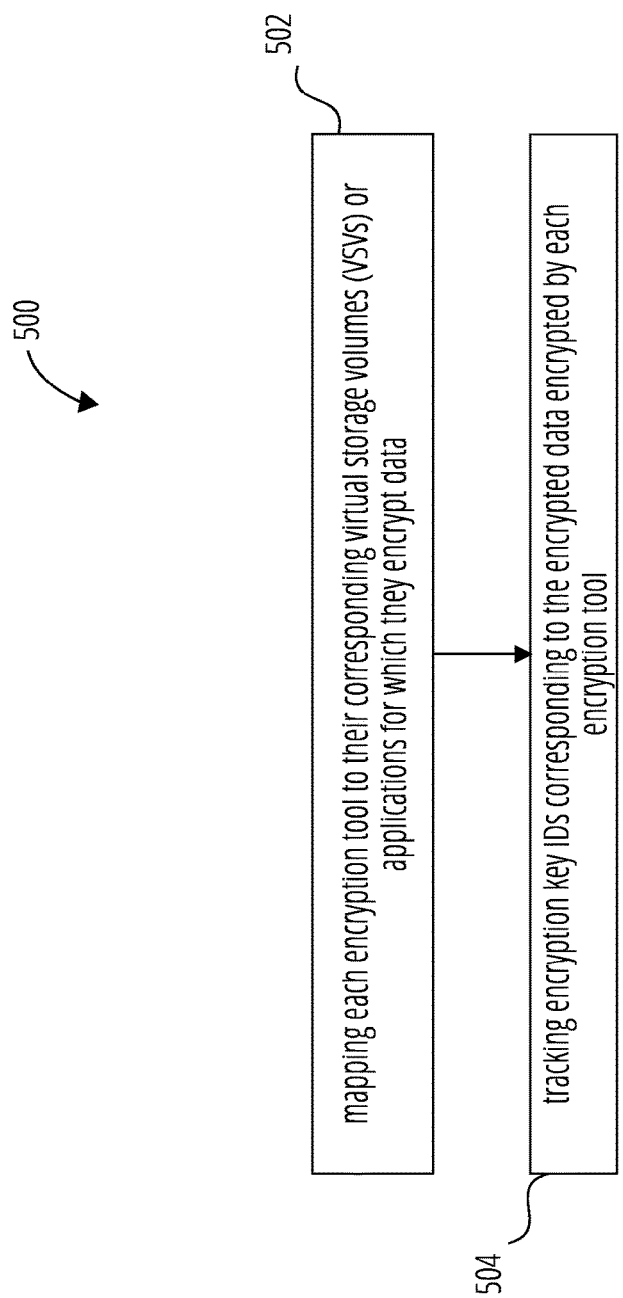
FIG. 5 is a flow diagram of an example method for tracking encryption key IDs in accordance with embodiments of the present disclosure.

Regarding FIG. 5, an example method 500 for tracking encryption key IDs. Although the example method 500 depicts a particular sequence of operations, the sequence can be altered without departing from the scope of the present disclosure. For example, some of the operations depicted can be performed in parallel or in a different sequence that does not materially affect the function of the method 500. In other examples, different components of an example device or system that implements the method 500 can perform functions at substantially the same time or in a specific sequence.

According to some examples, the method includes mapping each encryption tool to their corresponding virtual storage volumes (VSVs) or applications for which they encrypt data at 502. For example, the host system 124a of FIG. 1 can map each encryption tool to their corresponding virtual storage volumes (VSVs) or applications for which they encrypt data.

According to some examples, the method includes tracking encryption key IDs corresponding to the encrypted data encrypted by each encryption tool at 504. For example, host system 124a of FIG. 1 can track encryption key IDs corresponding to the encrypted data encrypted by each encryption tool.

Figure 6:
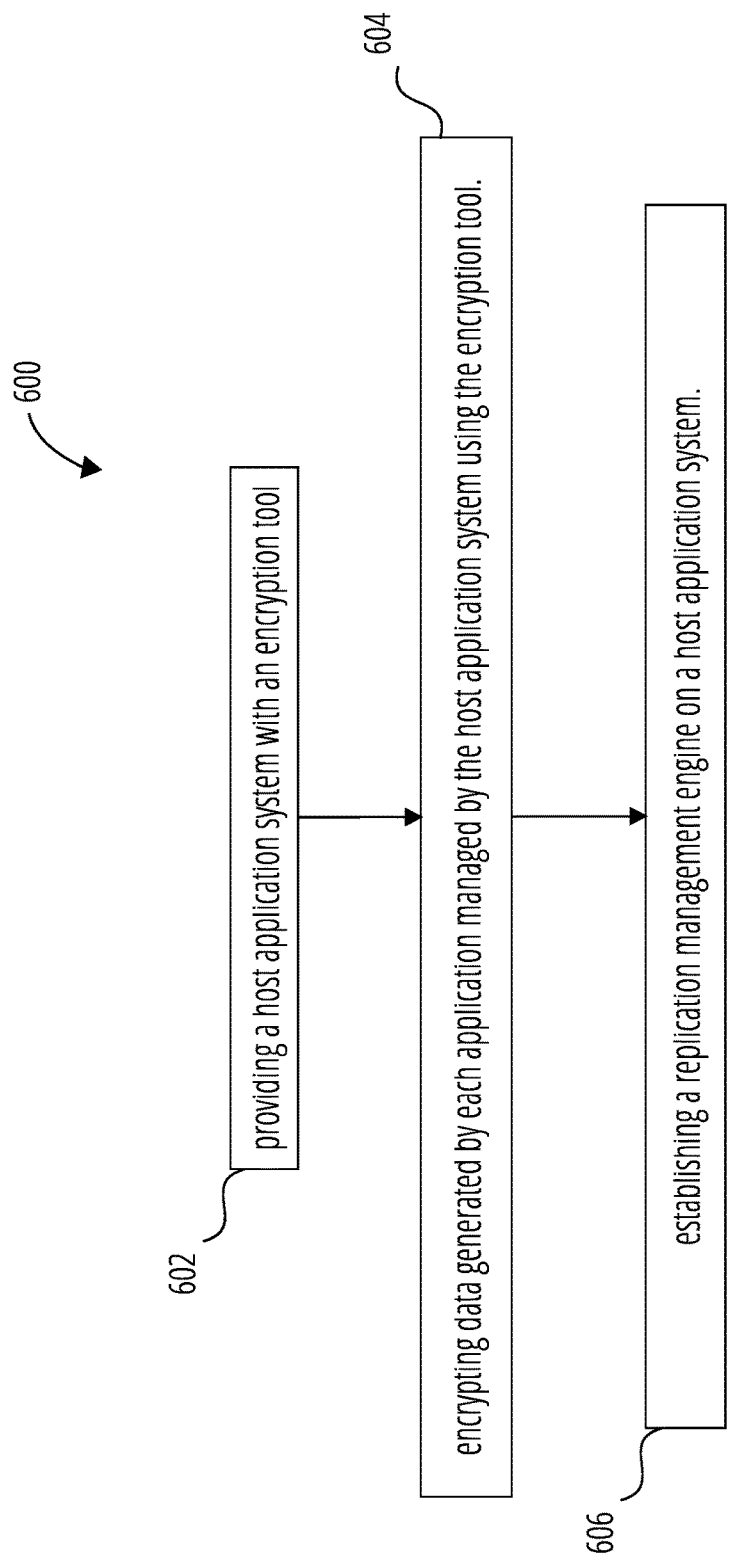
FIG. 6 is a flow diagram of an example method for encrypting data targeting a virtual storage volume in accordance with embodiments of the present disclosure.

Regarding FIG. 6, an example method 600 depicts operations for encrypting data targeting a virtual storage volume. Although the example method 600 depicts a particular sequence of operations, the sequence can be altered without departing from the scope of the present disclosure. For example, some of the operations depicted can be performed in parallel or in a different sequence that does not materially affect the function of the method 600. In other examples, different components of an example device or system that implements the method 600 can perform functions at substantially the same time or in a specific sequence.

According to some examples, the method includes providing a host application system with an encryption tool at 602. For example, the host 106 of FIG. 1 can provide a host application system with an encryption tool.

According to some examples, the method includes encrypting data generated by each application managed by the host application system using the encryption tool at block 604. For example, the host system 124b of FIG. 1 can encrypt data generated by each application managed by the host application system using the encryption tool.

According to some examples, the method includes establishing a replication management engine on a host application system at 606. For example, the controller 140 of FIG. 1 can establish a replication management engine on a host application system.

Figure 7:
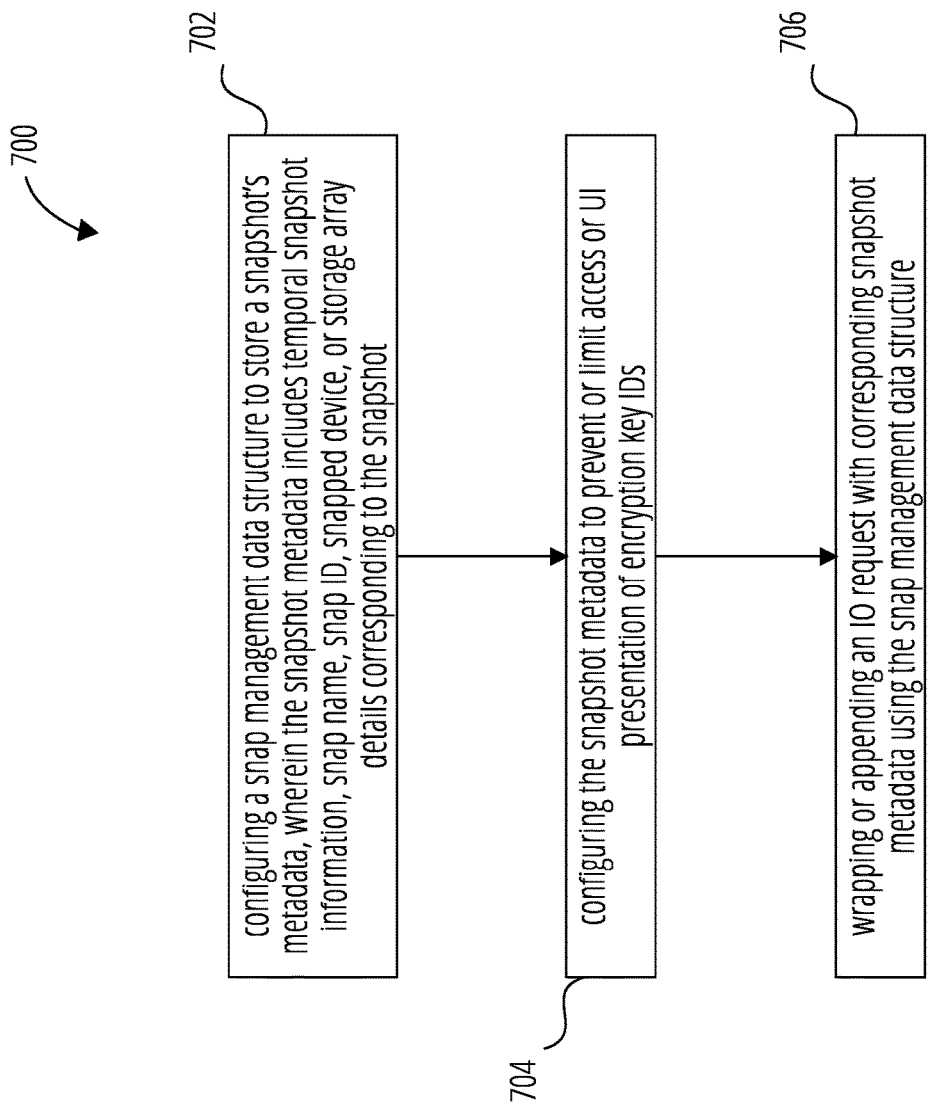
FIG. 7 is a flow diagram of an example method for generating storage array snapshots with encryption keys in accordance with embodiments of the present disclosure.

Regarding FIG. 7, an example method 700 depicts operations for generating snapshots. Although the example method 700 depicts a particular sequence of operations, the sequence can be altered without departing from the scope of the present disclosure. For example, some of the operations depicted can be performed in parallel or in a different sequence that does not materially affect the function of the method 700. In other examples, different components of an example device or system that implements the method 700 can perform functions at substantially the same time or in a specific sequence.

According to some examples, the method includes configuring a snap management data structure to store a snapshot's metadata. The snapshot metadata includes temporal snapshot information, snap name, snap ID, snapped device, or storage array details corresponding to the snapshot at 702. For example, the controller 140 of FIG. 1 can configure a snap management data structure to store a snapshot's metadata, wherein the snapshot metadata includes temporal snapshot information, snap name, snap ID, snapped device, or storage array details corresponding to the snapshot. Creating the snapshots according to a predefined snap schedule, dynamically generated snap schedule, or an ad-hoc snap request issued by a host application system with a replication management engine.

According to some examples, the method includes configuring the snapshot metadata to prevent or limit access or UI presentation of encryption key IDs at 704. For example, the controller 140 of FIG. 1 can configure the snapshot metadata to prevent or limit access or UI presentation of encryption key IDs. Obtaining snapshot metadata of snapshots generated by the storage array according to a predefined or dynamically generated snap schedule.

According to some examples, the method includes wrapping or appending an IO request with corresponding snapshot metadata using the snap management data structure at 706. For example, the controller 140 of FIG. 1 can wrap or append an IO request with corresponding snapshot metadata using the snap management data structure.

Figure 8:
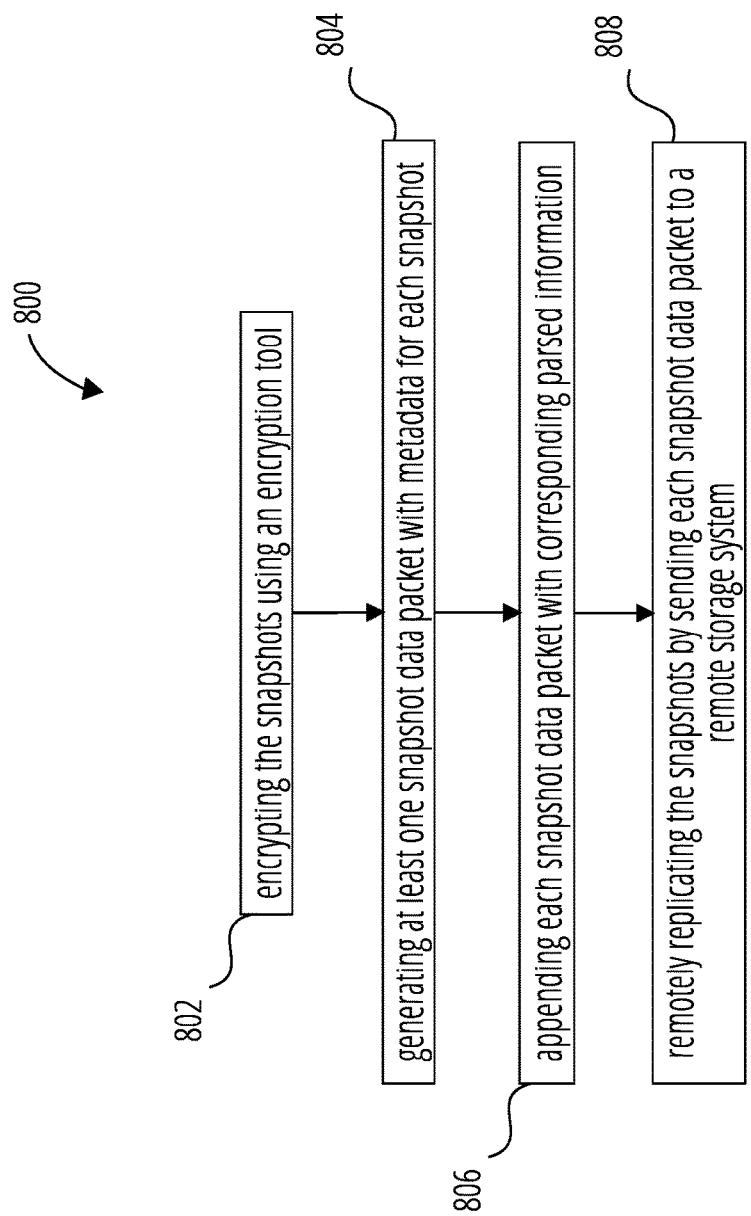
FIG. 8 is a flow diagram of an example method for encrypting storage array snapshots with encryption keys in accordance with embodiments of the present disclosure.

Regarding FIG. 8, an example method 800 depicts operations for encrypting snapshots. Although the example method 800 depicts a particular sequence of operations, the sequence can be altered without departing from the scope of the present disclosure. For example, some of the operations depicted can be performed in parallel or in a different sequence that does not materially affect the function of the method 800. In other examples, different components of an example device or system that implements the method 800 can perform functions at substantially the same time or in a specific sequence.

According to some examples, the method includes encrypting the snapshots using an encryption tool at 802. For example, the controller 140 of FIG. 1 can encrypt the snapshots using an encryption tool.

According to some examples, the method includes generating at least one snapshot data packet with metadata for each snapshot at 804. For example, the controller 140 of FIG. 1 can generate at least one snapshot data packet with metadata for each snapshot.

According to some examples, the method includes appending each snapshot data packet with corresponding parsed information at 806. For example, the controller 140 of FIG. 1 can append each snapshot data packet with corresponding parsed information.

According to some examples, the method includes remotely replicating the snapshots by sending each snapshot data packet to a remote storage system at 808.

Figure 9:
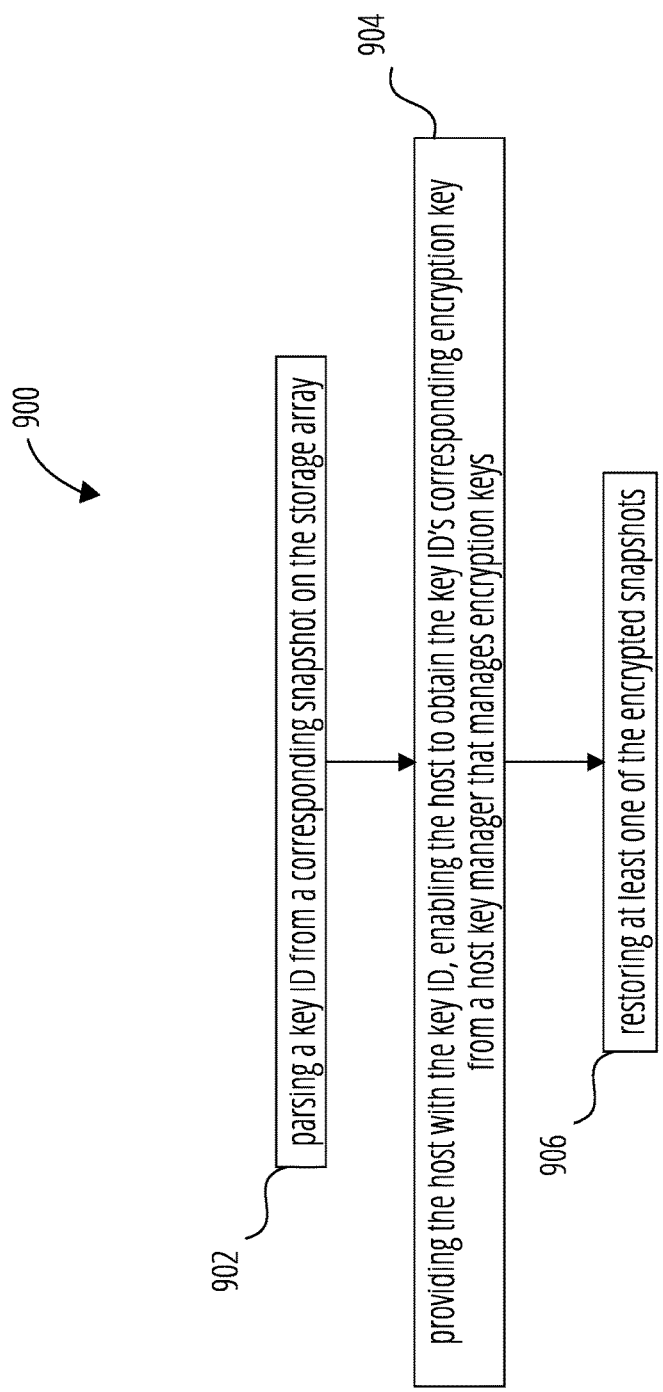
FIG. 9 is a flow diagram of an example method for restoring storage array snapshots with encryption keys in accordance with embodiments of the present disclosure.

Regarding FIG. 9, an example 900 depicts operations for restoring snapshots. Although the example 900 depicts a particular sequence of operations, the sequence can be altered without departing from the scope of the present disclosure. For example, some of the operations depicted can be performed in parallel or in a different sequence that does not materially affect the function of the 900. In other examples, different components of an example device or system that implements the 900 can perform functions at substantially the same time or in a specific sequence.

According to some examples, the method includes parsing a key ID from a corresponding snapshot on the storage array at 902. For example, the controller 140 of FIG. 1 can pars a key ID from a corresponding snapshot on the storage array.

According to some examples, the method includes providing the host with the key ID, enabling the host to obtain the key ID's corresponding encryption key from a host key manager that manages encryption keys at 904. For example, the controller 140 of FIG. 1 can provide the host with the key ID, enabling the host to obtain the key ID's corresponding encryption key from a host key manager that manages encryption keys.

According to some examples, the method includes restoring at least one of the encrypted snapshots at 906. For example, the controller 140 of FIG. 1 can restore at least one of the encrypted snapshots.

Further, each operation of the method(s) described above can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
   receiving an input/output (IO) workload at a storage array, wherein the IO workload includes an IO request to write encrypted data on the storage array;
   parsing the IO request's metadata for information, including snap parameters;
   receiving an encryption key identifier (ID) from a host;
   creating snapshots of a storage unit with the parsed information and the key ID;
   configuring a snap management data structure to store a snapshot's metadata, wherein the snapshot metadata includes temporal snapshot information, snap name, snap ID, snapped device, or storage array details corresponding to the snapshot;
   configuring the snapshot metadata to prevent or limit access or UI presentation of encryption key IDs; and
   wrapping or appending an IO request with corresponding snapshot metadata using the snap management data structure.

2. The method of claim 1, further comprising:
   establishing a virtual storage volume (VSV) for a host entity using one or more storage device portions of the storage array; and
   parsing the IO request's metadata for a target VSV to write the encrypted data.

3. The method of claim 1, further comprising:
   managing encryption tools by a host key manager, wherein managing the encryption tools includes:
      mapping each encryption tool to their corresponding virtual storage volumes (VSVs) or applications for which they encrypt data, and
      tracking encryption key IDs corresponding to the encrypted data encrypted by each encryption tool.

4. The method of claim 1, further comprising:
   providing a host application system with an encryption tool; and
   encrypting data generated by each application managed by the host application system using the encryption tool.

5. The method of claim 4, further comprising:
   establishing a replication management engine on a host application system.

6. The method of claim 1, further comprising:
   creating the snapshots according to a predefined snap schedule, dynamically generated snap schedule or an ad-hoc snap request issued by a host application system with a replication management engine.

7. The method of claim 1, further comprising:
   obtaining snapshot metadata of snapshots generated by the storage array according to a predefined or dynamically generated snap schedule.

8. The method of claim 1, further comprising:
   encrypting the snapshots using an encryption tool; and
   generating at least one snapshot data packet with metadata for each snapshot;
   appending each snapshot data packet with corresponding parsed information; and
   remotely replicating the snapshots by sending each snapshot data packet to a remote storage system.

9. The method of claim 8, further comprising:
   restoring at least one of the encrypted snapshots, wherein restoring the at least one of the encrypted snapshots includes:

parsing the key ID from a corresponding snapshot on the storage array, and providing the host with the key ID, enabling the host to obtain the key ID's corresponding encryption key from a host key manager that manages encryption keys.

10. A system with a processor and memory, the system configured to:

receive an input/output (IO) workload at a storage array, wherein the IO workload includes an IO request to write encrypted data on the storage array;

parse the IO request's metadata for information, including snap parameters;

receive an encryption key identifier (ID) from a host;

create snapshots of a storage unit with the parsed information and the key ID;

configure a snap management data structure to store a snapshot's metadata, wherein the snapshot metadata includes temporal snapshot information, snap name, snap ID, snapped device, or storage array details corresponding to the snapshot;

configure the snapshot metadata to prevent or limit access or UI presentation of encryption key IDs; and wrap or append an IO request with corresponding snapshot metadata using the snap management data structure.

11. The system of claim 10, further configured to:

establish a virtual storage volume (VSV) for a host entity using one or more storage device portions of the storage array; and parse the IO request's metadata for a target VSV to write the encrypted data.

12. The system of claim 10, further configured to:

manage encryption tools by:

mapping each encryption tool to their corresponding virtual storage volumes (VSVs) or applications for which they encrypt data, and tracking encryption key IDs corresponding to the encrypted data encrypted by each encryption tool.

13. The system of claim 10, further configured to:

provide a host application system with an encryption tool; and encrypt data generated by each application managed by the host application system using the encryption tool.

14. The system of claim 13, further configured to:

establish a replication management engine on a host application system.

15. The system of claim 10, further configured to:

create the snapshots according to a predefined snap schedule, dynamically generated snap schedule or an ad-hoc snap request issued by a host application system with a replication management engine.

16. The system of claim 10, further configured to:

obtain snapshot metadata of snapshots generated by the storage array according to a predefined or dynamically generated snap schedule.

17. The system of claim 10, further configured to:

encrypt the snapshots using an encryption tool; and generate at least one snapshot data packet with metadata for each snapshot;

append each snapshot data packet with corresponding parsed information; and remotely replicate the snapshots by sending each snapshot data packet to a remote storage system.

18. The system of claim 17, further configured to:

restore at least one of the encrypted snapshots, wherein restoring the at least one of the encrypted snapshots includes:

parse the key ID from a corresponding snapshot on the storage array, and provide the host with the key ID, enabling the host to obtain the key ID's corresponding encryption key from a host key manager that manages encryption keys.

\* \* \* \* \*